United States Patent
Nakamura et al.

(10) Patent No.: US 8,418,503 B2
(45) Date of Patent: Apr. 16, 2013

(54) SHEET GLASS AND METHOD FOR MANUFACTURING SHEET GLASS

(75) Inventors: Toshihiro Nakamura, Tokyo (JP); Sadayuki Toda, Tokyo (JP); Hisashi Koaizawa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/987,420

(22) Filed: Jan. 10, 2011

(65) Prior Publication Data
US 2011/0100059 A1  May 5, 2011

Related U.S. Application Data

(62) Division of application No. 11/626,007, filed on Jan. 23, 2007, now Pat. No. 7,883,778.

(30) Foreign Application Priority Data

Jan. 27, 2006 (JP) .................................. 2006-019752

(51) Int. Cl.
*C03B 23/037*    (2006.01)

(52) U.S. Cl.
USPC .................. 65/106; 65/94; 65/102; 65/93

(58) Field of Classification Search .................. 65/106, 65/93, 94, 102
See application file for complete search history.

(56) References Cited

U.S. PATENT DOCUMENTS

2004/0050105 A1 *  3/2004  Morishita et al. ................ 65/63
2005/0013972 A1    1/2005  Kusabiraki et al.

FOREIGN PATENT DOCUMENTS

| JP | 11-199255 | 7/1999 |
| JP | 2000-203857 | 7/2000 |
| JP | 2001-80929 | 3/2001 |
| JP | 2004-221541 | 8/2004 |

OTHER PUBLICATIONS

Machine translation of JP 11-199255, Inui Takeshi, Production of Thin Sheet Glass, Jul. 27, 1999.*
Office Action issued Feb. 21, 2012, in Japanese Patent Application No. 2006-019752 with English translation.
U.S. Appl. No. 13/452,428, filed Apr. 20, 2012, Nakamura, et al.
Office Action dated Oct. 9, 2012, in Japanese Patent Application No. 2006-019752, filed Jan. 27, 2006 (with English-language translation.).

* cited by examiner

*Primary Examiner* — Queenie Dehghan
(74) *Attorney, Agent, or Firm* — Oblon, Spivak, McClelland, Maier & Neustadt, L.L.P.

(57) ABSTRACT

A sheet glass that has a side surface with an average surface roughness equal to or less than 0.2 µm is provided. Furthermore, a method of manufacturing a sheet glass is provided that includes processing a base-material glass sheet to obtain a sheet glass that has a side surface with an average surface roughness equal to or less than 0.2 µm. Moreover, a method of manufacturing a sheet glass is provided that includes processing a base-material glass sheet so that an average surface roughness of a side surface becomes equal to or less than a predetermined value according to a section modulus of the sheet glass that is to be manufactured.

6 Claims, 5 Drawing Sheets

| | WIDTH OF BASE MATERIAL (mm) | THICKNESS OF BASE MATERIAL (mm) | THICKNESS-REDUCTION RATIO (%) | Ra1 ($\mu$m) | Ra2 ($\mu$m) | BREAKAGE-THRESHOLD ANGLE (DEGREE) |
|---|---|---|---|---|---|---|
| EXAMPLE 1 | 200 | 40 | 2.5 | 0.0078 | 0.0396 | 58 |
| EXAMPLE 2 | 100 | 20 | 5 | 0.0036 | 0.048 | 54 |
| EXAMPLE 3 | 50 | 10 | 10 | 0.0085 | 0.199 | 44 |
| COMPARATIVE EXAMPLE 1 | - | - | - | 0.0128 | 0.8228 | 28 |

FIG.6

| | MATERIAL | WIDTH (mm) | THICKNESS (mm) | SECTION MODULUS | Ra2 ($\mu m$) | BREAKAGE-THRESHOLD ANGLE (DEGREE) |
|---|---|---|---|---|---|---|
| EXAMPLE 4 | SILICA GLASS | 7.85 | 0.224 | 0.0656 | ≦0.05 | 45 |
| EXAMPLE 5 | | 3.35 | 0.158 | 0.0139 | | 64 |
| EXAMPLE 6 | | 2.96 | 0.126 | 0.0078 | | 81 |
| EXAMPLE 7 | | 0.45 | 0.123 | 0.0011 | | 126 |
| EXAMPLE 8 | | 0.71 | 0.198 | 0.0046 | | 91 |
| EXAMPLE 9 | MULTICOMPONENT GLASS | 3.71 | 0.116 | 0.0083 | 0.05 TO 0.2 | 60 |
| EXAMPLE 10 | | 2.05 | 0.102 | 0.0036 | | 80 |
| EXAMPLE 11 | | 3.87 | 0.108 | 0.0075 | | 60 |
| EXAMPLE 12 | | 4.56 | 0.115 | 0.0101 | | 54 |
| EXAMPLE 13 | | 5.57 | 0.126 | 0.0147 | | 40 |
| COMPARATIVE EXAMPLE 2 | SILICA GLASS | 5.01 | 0.1 | 0.0084 | 0.5 TO 1 | 28 |
| COMPARATIVE EXAMPLE 3 | | 3.02 | 0.1 | 0.0050 | | 39 |

SHEET GLASS AND METHOD FOR MANUFACTURING SHEET GLASS

CROSS-REFERENCE TO RELATED APPLICATIONS

This application is a divisional of U.S. Ser. No. 11/626,007 filed Jan. 23, 2007 which claims priority under 35 U.S.C. 119 to Japanese priority document, 2006-019752 filed in Japan on Jan. 27, 2006, the entire contents of both of which are incorporated herein by reference.

BACKGROUND OF THE INVENTION

1. Field of the Invention

The present invention relates to a sheet glass and a method for manufacturing the sheet glass.

2. Description of the Related Art

In recent years, demand has been increasing for sheet glass used for semiconductor substrates, spacers of field-effect flat panel displays, magnetic disk substrates and the like. Methods of manufacturing sheet glass include polishing a base-material glass sheet of a predetermined thickness to a sheet glass of a desirable thickness. A method has been disclosed for manufacturing sheet glass with good surface characteristics in large quantities at low cost. The method involves using of the base-material glass sheet, which is of a predetermined thickness and has a better surface roughness. The base-material glass sheet is softened by heating, and is drawn to obtain sheet glass of a desired thickness (see Japanese Patent Application Laid-Open No. H11-199255).

Various applications of flexible sheet glass are being examined. Specifically, assurance of reliability of flexibility is an important requirement in applications that use a flexible glass. However, the conventional sheet glass is easily breakable if force is applied to the sheet glass in a direction in which the sheet glass is twisted. This problem lowers the reliability of flexibility.

SUMMARY OF THE INVENTION

It is an object of the present invention to at least partially solve the problems in the conventional technology.

According to an aspect of the present invention, a sheet glass includes a side surface of an average surface roughness equal to or less than 0.2 micrometer.

According to another aspect of the present invention, a method of manufacturing a sheet glass includes processing a base-material glass sheet to obtain a sheet glass that includes a side surface with an average surface roughness equal to or less than 0.2 micrometer.

According to still another aspect of the present invention, a method of manufacturing a sheet glass includes processing a base-material glass sheet to obtain a sheet glass that includes a side surface with an average surface roughness equal to or less than a predetermined value according to a section modulus of the sheet glass to be manufactured.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a table of material, width and thickness, section modulus, Ra2 values, and breakage-threshold angles with respect to sheet glass strips in examples 4 to 13 and comparative examples 2 and 3.

DETAILED DESCRIPTION OF THE PREFERRED EMBODIMENTS

Exemplary embodiments of the present invention are explained in detail below with reference to the accompanying drawings. The present invention is not limited to the embodiments, and can be variously changed or modified without departing from the scope of the invention.

Figure 1:
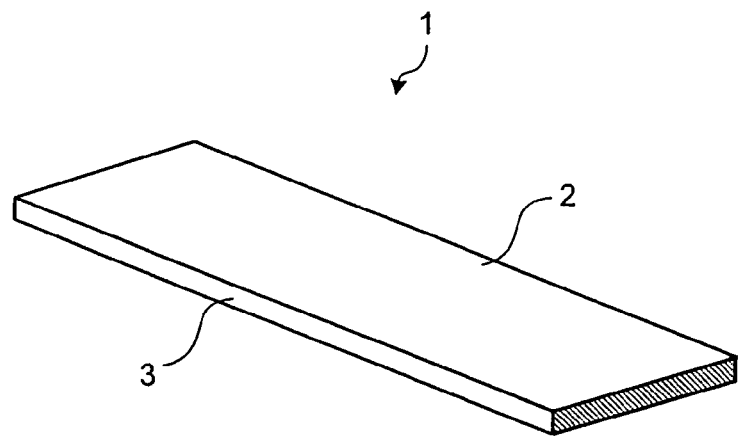
FIG. 1 is a perspective view of a sheet glass cut perpendicularly along the length according to a first embodiment of the present invention.

FIG. 1 is a perspective view of a sheet glass 1 cut perpendicularly along the length according to a first embodiment of the present invention. The shaded area indicates a cut plane of the sheet glass. The sheet glass 1 is strip-shaped, and a surface perpendicular to the length of the sheet glass 1 is rectangular. Two opposite surfaces on the long sides of the rectangle are main surfaces 2 and two opposite surfaces on the short sides of the rectangle are side surfaces 3. A strip shape is a shape that has the side surfaces 3 with an area that is larger than the area of two cut planes formed when the strip is cut along the length.

The reliability of flexibility depends on the surface roughness of the surfaces 2 and 3. A smaller value of the surface roughness makes the sheet glass harder to break when force is applied to the sheet glass in a direction in which the sheet glass is twisted. In other words, a sheet glass with smaller surface roughness has higher reliability of flexibility. According to the first embodiment of the present invention, the side surfaces 3 have smaller average surface roughness equal to or less than 0.2 µm. It is preferable that the average surface roughness of the side surfaces 3 is equal to or less than 0.05 µm to enhance the reliability of flexibility. Moreover, the average surface roughness of the main surfaces 2 is equal to or less than 0.01 µm. The average surface roughness could be adjusted appropriately depending where and how the sheet glass is going to be used. The average surface roughness equal to or less than 0.005 µm is desirable. The average surface roughness of the side surfaces of the sheet glass is indicated below by Ra2, and the average surface roughness of the main surfaces is indicated below by Ra1. The average surface roughness is obtained from the arithmetic average height of the roughness curve defined in JIS B0601:2001.

The sheet glass 1 with a small Ra2 can be manufactured with a method of manufacturing a sheet glass explained in a second embodiment of the present invention.

Figure 2:
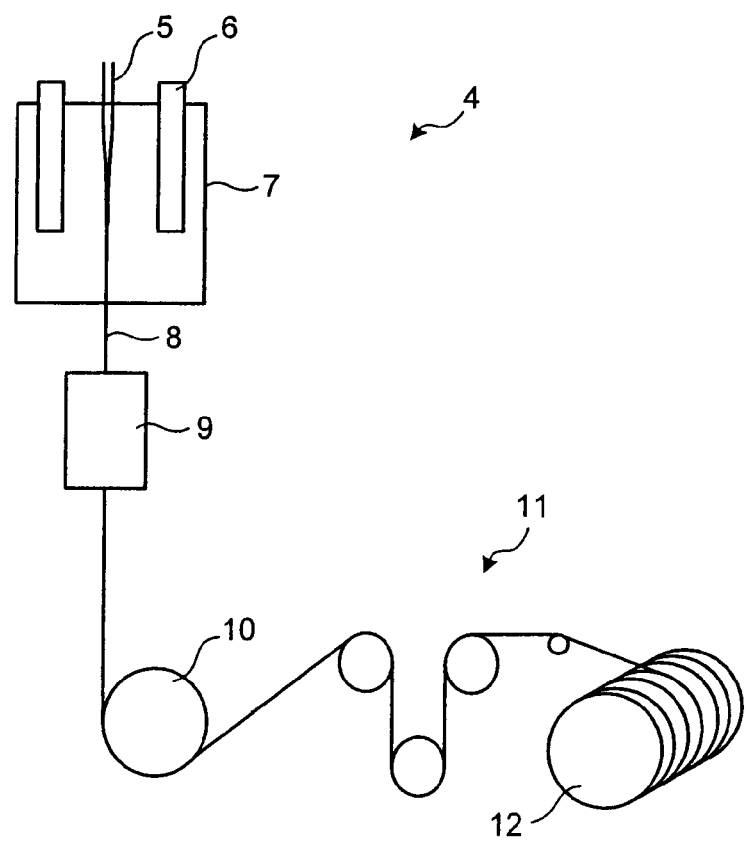
FIG. 2 is a schematic of a heat-drawing apparatus used for manufacturing a sheet glass according to a second embodiment of the present invention.

FIG. 2 is a schematic of a heat-drawing apparatus used for manufacturing the sheet glass according to the second embodiment. A heat-drawing apparatus 4 includes a heating furnace 7 that includes a carbon heater 6, a protective-film coating device 9, a capstan 10, a tension adjusting mechanism 11 that is formed of a plurality of rollers, and a bobbin 12.

Next, explanation is given about the method of manufacturing a sheet glass by using the heat-drawing apparatus 4. First, a rectangular base-material glass sheet 5 is prepared with a predetermined length, width, and thickness. The base-material glass sheet 5 includes main surfaces and side surfaces that are of average surface roughness. It is desirable that the chamfering is done of the corners on long sides of the base-material glass sheet 5 to prevent cracking of the base-material glass sheet 5. It is preferred that the corners of the base-material glass sheet 5 are chamfered to equal to or less than 1 mm width, considering production yield. It is further desirable that the chamfering width is equal to or less than 0.5 mm. The base-material glass sheet 5 is set in the heating furnace 7 so that the long side of the base-material glass sheet 5 is in a vertical position. The base-material glass sheet 5 is heated with the carbon heater 6 to soften it, and is drawn to a sheet glass strip 8 of a predetermined width and thickness. Width and thickness of the sheet glass strip 8 can be adjusted by adjusting speed of drawing. Longitudinal side surface of the base-material glass sheet 5 is formed into the side surface of the sheet glass strip 8 through the heat-drawing process. In the method of manufacturing according to the second embodiment, the base-material glass sheet 5 is processed in such a manner that the Ra2 of the sheet glass strip 8 is equal to or less than 0.2 μm, which is obtained by adjusting the thickness-reduction ratio of the base material glass sheet, during the process of heat-drawing.

The thickness-reduction ratio is obtained by (width of the sheet glass÷width of base-material glass sheet)×100, and it is possible to adjust the thickness-reduction ratio by adjusting the speed of drawing. The thickness-reduction ratio is adjusted depending on the average surface roughness of the base material glass sheet 5 to obtain the sheet glass strip 8 having Ra2 equal to or less than 0.2 μm. That is, if the thickness-reduction ratio is smaller, Ra2 of the sheet glass can be smaller as well.

If the base-material glass sheet 5 is cut from a considerably large glass sheet, the average surface roughness of the cut surface is as large as 1.0 μm. However, in the method of manufacturing according to the second embodiment, the thickness-reduction ratio is adjusted to be equal to or less than 10%. Thus, even if the average surface roughness of the base-material glass sheet 5 is as large as 1.0 μm, it is possible to obtain the sheet glass strip 8, whose Ra2 is less than 0.2 μm. Thus, when the side surface of the sheet glass is formed by the process of melting, it is possible to obtain highly flexible sheet glass.

Further, if the thickness-reduction ratio is less than 5%, it is possible to obtain the sheet glass strip 8, whose Ra2 is equal to or less than 0.05 μm. Furthermore, if the average surface roughness of the side surfaces of the base-material glass sheet 5 is reduced to, for example, equal to or less than 0.05 μm by etching and polishing before the base-material glass sheet 5 is heat-drawn, Ra2 of the sheet glass strip 8 can be further reduced. Alternatively, Ra2 of the sheet glass strip 8 can be reduced to a desired value, even when the thickness-reduction ratio is not made smaller.

The protective-film coating device 9 sprays coating material on to the heat-drawn sheet glass strip 8, without touching the sheet glass strip 8. Thus, the sheet glass strip 8 is coated with a protective film. The surface of the sheet glass strip 8 can be coated by sticking a protective tape, by wrapping a protective wrap, or by painting the coating material with dies and rollers on the surface of the sheet glass strip 8.

Next, the capstan 10 winds the sheet glass strip 8 on to the bobbin 12, after passing the sheet glass strip 8 through the tension adjusting mechanism 11. A predetermined amount of tension is applied by the tension adjusting mechanism 11 to the sheet glass strip 8. Thus, the sheet glass strip 8 is smoothly wound on to the bobbin 12. The sheet glass strip 8 does not touch the capstan and the like before being coated with the protective film, and is wound after the sheet glass strip 8 is coated with the protective film, which indicates that the sheet glass with small Ra1 and Ra2 is easy to obtain. At the time of winding, when the sheet glass strip 8 traverses across the width of the bobbin 12, it is wound evenly along the width of the bobbin. However, when the sheet glass strip 8 is traversing, a force is applied to the sheet glass in the direction of the twist. The sheet glass strip 8, manufactured according to the method of manufacturing the sheet glass according to the second embodiment, is hard to break even when the force is applied to the sheet glass in the direction in which the sheet glass is twisted. Therefore, the sheet glass strip 8 is hard to break, even when width of the bobbin is increased and the sheet glass strip 8 is traversed. Further, the sheet glass strip 8 is hard to break even if the sheet glass strip 8 is twisted or bent when it passes through a guide roller. Thus, the sheet glass strip 8 can be wider in winding width and can be wound more efficiently onto the bobbin, leading to improved productivity.

The sheet glass strip 8, manufactured according to the method of manufacturing the sheet glass according to the second embodiment, has high reliability of flexibility, because, Ra2 is equal to or less than 0.2 μm, and is hard to break even when the force is applied to the sheet glass in a direction in which the sheet glass is twisted. The sheet glass strip 8 can be used in an application that requires flexible glass strips, cut to a predetermined length.

Next, a method of manufacturing a sheet glass according to a third embodiment of the present invention is explained below. The method of manufacturing according to the third embodiment is similar to that according to the second embodiment. The difference between the two methods is that the base-material glass sheet is processed so that the average surface roughness of the side surfaces of the sheet glass is equal to or less than a predetermined value according to the section modulus of the sheet glass that is to be manufactured.

The section modulus is used to find bending stress on the material, thus, it is a modulus that indicates shape of the cross section of the material. When the cross section of the sheet glass is rectangular, and the length of the long side of the rectangle, that is, the width of the sheet glass is h, and the length of the short side of the rectangle, that is, thickness of the sheet glass is d, the section modulus of the sheet glass can be represented in an equation $h \times d^2/6$.

Next, explanation is given about the method of manufacturing the sheet glass according to the third embodiment. First, as in case of the method of manufacturing the sheet glass according to the second embodiment, the heat-drawing apparatus is used to heat-draw the rectangular base glass material that is of predetermined length, width, and thickness. The base-material glass sheet includes main surfaces and side surfaces that are of average surface roughness. The base-material glass sheet is set in the heating furnace so that the long side of the rectangular base-material glass sheet is perpendicular to the heating furnace. The base-material glass sheet is heated by the carbon heater to be softened, and drawn to form a sheet glass of a predetermined width and thickness. The sheet glass is then coated with a protective film and is wound on the bobbin. In the method of manufacturing the sheet glass according to the third embodiment, at the time of heat-drawing, the process of heat-drawing is performed by adjusting the thickness-reduction ratio so that the average surface roughness of the side surfaces of the sheet glass strip is equal to or less than the predetermined value according to the section modulus decided by the width and the thickness of the sheet glass strip that is to be manufactured. As a result of which, it is possible to manufacture the sheet glass strip with the average surface roughness of the side surfaces according to the section modulus. The sheet glass made according to this method is hard to break even when the force is applied on the sheet glass in the direction the sheet glass is twisted, and has high reliability of flexibility.

Examples of the manufacturing method of the sheet glass according to the present invention are explained in detail below. Scope of the present invention is not limited by the examples.

First, base-material glass sheets were prepared. The base-material glass sheets were made of silica and were 1.5 m in length. The base-material glass sheets were different in width and thickness. As shown in FIG. 2, the base-material glass sheets were heat-drawn in the heat-drawing apparatus, which had a furnace temperature of 2000° C., and sheet glass strips 5 mm in width and 0.1 mm in thickness were manufactured (examples 1 to 3). The average surface roughness of the main surfaces of the base-material glass sheets was 0.3 μm, and the average surface roughness of the side surfaces was 1.0 μm.

On the other hand, a large glass sheet made of silica with a thickness of 3 mm was cut to a predetermined size, and was polished from an upper surface. The large glass sheet was further cut to produce a sheet glass of 5 mm width and of 0.1 mm thickness (comparative example 1).

Figures 3, 4:
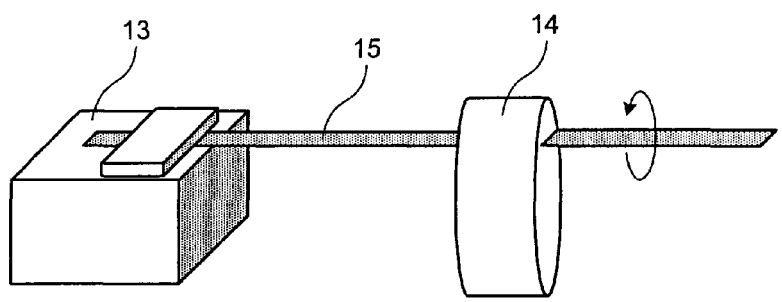
FIG. 3 is a perspective for explaining a method of measuring a breakage-threshold angle.
FIG. 4 is a table of width and thickness of base-material glass sheets, thickness-reduction ratios, Ra1 and Ra2 values of sheet glass strips, breakage-threshold angles with respect to examples 1 to 3 and a comparative example 1.

The sheet glass strips used in the examples 1 to 3 and the comparative example 1 were assessed in a state that the sheet glass strips were not coated. The sheet glass strips were assessed with respect to their strength by measuring the breakage-threshold angle when the sheet glass strips were twisted. FIG. 3 is a schematic for explaining a method of measuring the breakage-threshold angle. First, a sheet glass 15 was held firmly with a fixing jig 13 and a rotating jig 14. The fixing jig 13 and the rotating jig 14 were separated by 25 mm. The breakage-threshold angle is an angle at which the sheet glass 15 broke when the rotating jig 14 was rotated at a speed of 20°/sec.

Figure 5:
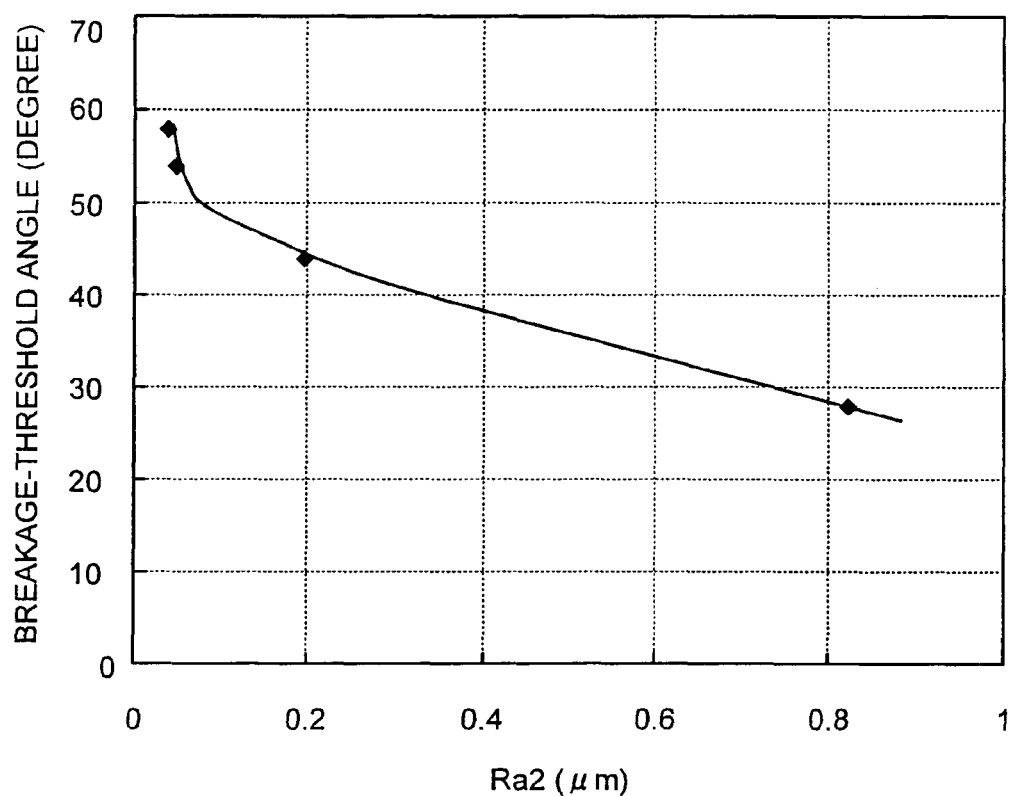
FIG. 5 is a graph depicting relationship between the Ra2 values and the breakage-threshold angles with respect to the sheet glass strips in the examples 1 to 3 and the comparative example 1.

FIG. 4 is a table enlisting width and thickness of a base-material glass sheet, thickness-reduction ratio, Ra1 and Ra2 values of the sheet glass strips, the breakage-threshold angle with respect to the examples 1 to 3 and the comparative example 1. FIG. 5 is a graph depicting a relationship between Ra2 value and the breakage-threshold angle with respect to the sheet glass strips in the examples 1 to 3 and the comparative example 1. As shown in FIGS. 4 and 5, as Ra2 becomes smaller, the breakage-threshold angle becomes larger. If Ra2 is equal to or less than 0.2 μm, the breakage-threshold angle is 40°. If Ra2 is smaller, the breakage-threshold angle becomes considerably larger, and the reliability of flexibility of the sheet glass is sufficiently high. Furthermore, if Ra2 is equal to or less than 0.05 the breakage-threshold angle is larger than 50°. If Ra2 is smaller, the breakage-threshold angle becomes considerably larger, and the reliability of flexibility of the sheet glass is further improved.

Base-material glass sheets made of silica or multiple-component glass (Tempax float (registered trademark) manufactured by Schott), with different widths and thicknesses were prepared. The average surface roughness of the main surfaces was 0.3 μm and the average surface roughness of the side surfaces was 1.0 μm. As shown in FIG. 2, the silica glass sheets were heat-drawn in the heat-drawing apparatus, which had a furnace temperature of 2000° C., and the multiple-component glass strips were heat-drawn in the heat-drawing apparatus, which had a furnace temperature of 1000° C., and sheet glass strips of different widths and thicknesses, that is sheet glass strips with different section modulus were manufactured (examples 4 to 13). In the same manner, base-material glass sheets made of silica with different widths and thicknesses were prepared. The base-material glass sheets were about 1.5 m in length, and each had main surfaces with an average surface roughness of 0.3 μm, and side surfaces with an average surface roughness of 1.0 μm. The side surfaces of the base-material glass sheets were polished to manufacture the sheet glass strips (comparative examples 2 and 3). Values of Ra2 of the sheet glass strips were set to equal to or less than 0.05 μm (examples 4 to 8), 0.05 μm to 0.2 μm (examples 9 to 13), 0.5 μm to 1 μm (comparative examples 2 and 3), respectively, according to the section modulus of the sheet glass strips to be manufactured by adjusting the thickness-reduction ratio at the time of heat-drawing. Further, Ra1 for any one of the sheet glass strips was equal to or less than 0.01 μm.

The thickness-reduction ratio in the examples 4 to 8 is equal to or less than 5% and in the examples 9 to 13 is more than 5% and equal to or less than 10%.

Figure 7:
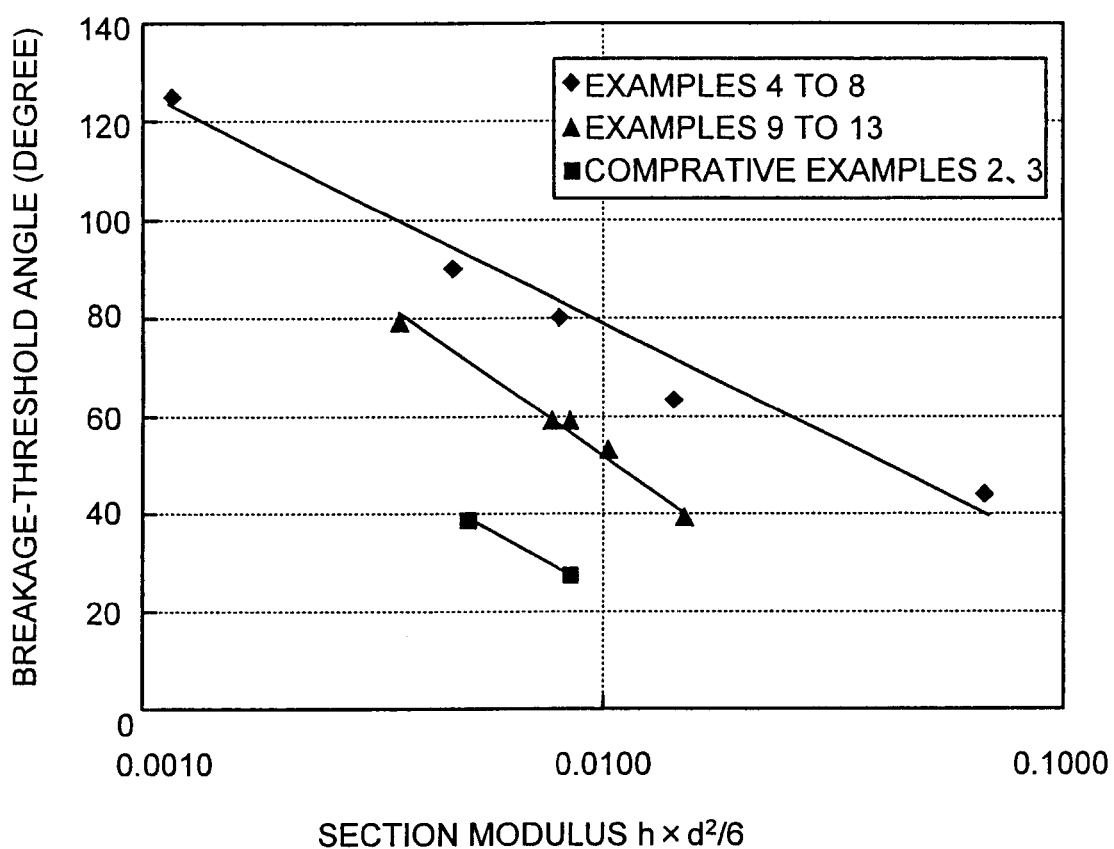
FIG. 7 is a graph depicting relationship between the section modulus and the breakage-threshold angles with respect to the sheet glass strips in examples 4 to 13 and comparative examples 2 and 3.

FIG. 6 is a table enlisting material, width and thickness, section modulus, Ra2 values, and breakage-threshold angles with respect to sheet glass strips in examples 4 to 13 and comparative examples 2 and 3. FIG. 7 is a graph depicting relationship between the section modulus and the breakage-threshold angles with respect to the sheet glass strips in examples 4 to 13 and comparative examples 2 and 3. As shown in FIGS. 6 and 7, as the section modulus becomes smaller, or as Ra2 becomes smaller, the breakage-threshold angle becomes larger. For example, if a highly flexible sheet glass that has a section modulus of 0.0036 and a breakage-threshold angle of 80° is to be produced, Ra2 of the sheet glass can be equal to or less than 0.2 μm. In such a case, the thickness-reduction ratio is, for example, equal to or less than 10%. Further, for example, if a sheet glass of higher flexibility, which has a section modulus of 0.078 and a breakage-threshold angle of 80 degrees is to be produced, Ra2 can be equal to or less than 0.05 μm. The thickness-reduction ratio in such a case is, for example, equal to or less than 5%.

That is, if the sheet glass is manufactured by processing the base-material glass sheet so that Ra2 is equal to or less than a predetermined value according to the section modulus of the sheet glass that is to be manufactured, it is confirmed that the manufactured sheet glass has the breakage-threshold angle of a desired value, and sufficiently high reliability of flexibility.

Furthermore, when Ra2 and shape of the sheet glass is decided, it is possible to estimate the breakage-threshold angle. For example, when Ra2 is equal to or less than 0.05 μm, width of the sheet glass is 20 mm, and the thickness is 0.14 mm, (that is, the section modulus is 0.0653), it is possible to estimate the breakage-threshold angle to be 40°, from an approximate curve in FIG. 7. Furthermore, with a sheet glass of the same width of 20 mm and a thickness of 0.05 mm, (that is, the section modulus is 0.0083), the breakage-threshold angle can be estimated to be equal to or more than 80°.

The explanation above is about making the average surface roughness of the side surfaces of the sheet glass equal to or less than the predetermined value by adjusting the thickness-reduction ratio, when the sheet glass is manufactured by heat-drawing the base-material glass sheet. However, the sheet glass can be manufactured by polishing the main surface of the base-material glass sheet. In this case, the average surface roughness of the side surfaces of the sheet glass can be adjusted to be equal to or less than the predetermined value by polishing the side surfaces of the base-material glass sheet.

As described above, according to an aspect of the present invention, the average surface roughness of the side surfaces of a sheet glass is equal to or less than 0.2 μm. Therefore, the sheet glass is hard to break even when the force is applied to the sheet glass in the direction in which the sheet glass is twisted. Thus, the sheet glass with high reliability of flexibility can be manufactured.

Moreover, the method of manufacturing a sheet glass includes a step of processing the base-material glass sheet so as to obtain the sheet glass with the average surface roughness of the side surfaces equal to or less than 0.2 μm. Therefore, the sheet glass is hard to break even when the force is applied to the sheet glass in the direction in which the sheet glass is twisted. Thus, the sheet glass with high reliability of flexibility can be manufactured.

Furthermore, the method of manufacturing a sheet glass includes a step of processing the base-material glass sheet so as to obtain the sheet glass with the average surface roughness of the side surfaces equal to or less than 0.2 μm according to the section modulus of the sheet glass. Therefore, the sheet glass is hard to break even when the force is applied to the sheet glass in the direction in which the sheet glass is twisted. Thus, the sheet glass with high reliability of flexibility can be manufactured.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of manufacturing a sheet glass having a predetermined thickness and a rectangular cross section from a base-material glass sheet having a rectangular cross section, the method comprising:
   selecting a breakage threshold angle for the sheet glass;
   establishing a correlation between a section modulus of the sheet glass and the breakage threshold angle of the sheet glass, the section modulus being calculated according to the following equation $$\text{section modulus} = h \times d^2 / 6$$

with h being a width of the sheet glass and d being the thickness of the sheet glass, the section modulus of the sheet glass being 0.0011 to 0.0656;
   determining a thickness-reduction ratio for heat-drawing, the thickness-reduction ratio being the width of the sheet glass divided by a width of the base-material glass sheet multiplied by 100%, the thickness-reduction ratio being determined for an average surface roughness of a side surface of the sheet glass that is equal to or less than a predetermined value; and
   heat-drawing the base-material glass sheet including:
      heating the base-material glass sheet to soften the base-material glass sheet; and
      drawing the base-material glass sheet at the determined thickness-reduction ratio to obtain the sheet glass with the selected breakage threshold angle that includes the side surface with the average surface roughness equal to or less than 0.2 micrometer.

2. The method of manufacturing a sheet glass according to claim 1, wherein the average surface roughness of the side surface of the sheet glass to be manufactured is equal to or less than 0.05 micrometer.

3. The method of manufacturing a sheet glass according to claim 1, wherein the determined thickness-reduction ratio for the heat-drawing is equal to or less than 10 percent.

4. The method of manufacturing a sheet glass according to claim 1, wherein the thickness-reduction ratio for the heat-drawing is adjusted by adjusting a speed of the drawing.

5. The method of manufacturing a sheet glass according to claim 1, wherein the thickness-reduction ratio for the heat-drawing is less than 5 percent.

6. A method of manufacturing a sheet glass having a predetermined thickness and a rectangular cross section from a base-material glass sheet having a rectangular cross section, the method comprising:
   selecting a breakage threshold angle for the sheet glass;
   establishing a correlation between a section modulus of the sheet glass and the breakage threshold angle of the sheet glass, the section modulus being calculated according to the following equation $$\text{section modulus} = h \times d^2 / 6$$

with h being a width of the sheet glass and d being the thickness of the sheet glass, the section modulus of the sheet glass being 0.0036 to 0.0147;
   determining a thickness-reduction ratio for heat-drawing, the thickness-reduction ratio being the width of the sheet glass divided by a width of the base-material glass sheet multiplied by 100%, the thickness-reduction ratio being determined for an average surface roughness of a side surface of the sheet glass that is equal to or less than a predetermined value; and
   heat-drawing the base-material glass sheet including:
      heating the base-material glass sheet to soften the base-material glass sheet; and
      drawing the base-material glass sheet at the determined thickness-reduction ratio to obtain the sheet glass with the selected breakage threshold angle that includes the side surface with the average surface roughness equal to or less than 0.2 micrometer.

* * * * *